United States Patent [19]
Bonde et al.

[11] Patent Number: 5,764,311
[45] Date of Patent: Jun. 9, 1998

[54] IMAGE PROCESSING APPARATUS

[75] Inventors: Hiroyuki Bonde, Yokohama; Toyotaka Machida, Kashiwa, both of Japan

[73] Assignee: Victor Company of Japan, Ltd., Japan

[21] Appl. No.: 565,765

[22] Filed: Nov. 30, 1995

[51] Int. Cl.$^6$ .................. H04N 3/22; H04N 3/26; H04N 3/23; H04N 2/223

[52] U.S. Cl. .................. 348/746; 348/745; 348/806

[58] Field of Search .................. 348/746, 745, 348/747, 806, 807; H04N 3/22, 3/26, 3/23, 2/223

[56] References Cited

U.S. PATENT DOCUMENTS

| | | | |
|---|---|---|---|
| 4,656,521 | 4/1987 | Trzeciak et al. | 348/746 |
| 4,706,115 | 11/1987 | Colineau et al. | 348/746 |
| 4,714,428 | 12/1987 | Bunker et al. | 434/43 |
| 5,426,471 | 6/1995 | Tanaka et al. | 348/746 |
| 5,465,121 | 11/1995 | Blalock et al. | |

FOREIGN PATENT DOCUMENTS

| | | |
|---|---|---|
| 0 308 315 | 3/1989 | France . |
| 63-073782 | 4/1988 | Japan . |
| 3080780 | 4/1991 | Japan . |
| 6-038152 | 2/1994 | Japan . |
| 6-082751 | 3/1994 | Japan . |
| 6-164966 | 6/1994 | Japan . |
| 2 244 887 | 12/1991 | United Kingdom . |
| 2 265 064 | 9/1993 | United Kingdom . |
| WO 87/03980 | 7/1987 | WIPO . |

*Primary Examiner*—Mark R. Powell
*Assistant Examiner*—Vivek Srivastava
*Attorney, Agent, or Firm*—Michael N. Meller

[57] ABSTRACT

The present invention provides an image processing apparatus for use with an image projector to allow the image projector to project a magnified image on a screen without a trapezoid distortion or a keystone distortion even when a normal line of the screen is declined to an optical axis of a projector lens of the projector. Digital image data from AD converter are stored in the image memory (6–9) through a selector (3). From the image memory, the image data of four pixels nearby a deformed coordinate position are read out through a selector (4). The image data of the deformed coordinate position is obtained by calculating an average of sum of arithmetic results obtained by giving a weight to each of image data of the four pixels. The weight given corresponds to a positional deviation value from the deformed coordinate position to the respective coordinate positions of the four pixels nearby the deformed coordinate position.

1 Claim, 4 Drawing Sheets

IMAGE PROCESSING APPARATUS

BACKGROUND OF THE INVENTION

1. Field of the Invention

This invention relates to an image processing apparatus for use with an image projector employing a liquid crystal light valve having plural pixels disposed in a two-dimensional array and, in particular, relates to an image processing apparatus for generating a preliminarily deformed image on the liquid crystal light valve corresponding to an original image so as to allow the projector to project a magnified image similar to the original image on a screen by using the preliminarily deformed image without generating a trapezoid distortion or a keystone distortion even when an optical axis of a projection optical system of the projector is inclined to a normal line of the screen.

2. Description of the Related Arts

In the prior art, various kinds of projectors for projecting a magnified image on a screen have been put into practical use.

Recently, there has been widely used a projector having a liquid crystal light valve which is controlled by image signals, wherein an original image light beam emitted from the liquid crystal light valve is displayed or projected as a magnified image on the screen through a projection optical system by causing a light beam emitted from a light source to be intensively modulated by the liquid crystal light valve.

Incidentally, upon projecting the original image on the screen, when the projector is installed in such a manner that an optical axis of a projection optical system (or projection lens) of the projector accords with a normal line of the screen, a magnified image similar to the original image is projected as a normal rectangular picture on the screen without the trapezoid distortion (keystone distortion).

In that case, however, when the projector is installed in front of the screen, the projector itself blocks the view of audience, thus it disturbs their enjoyment of the projected image.

Accordingly, the projector is generally installed on a place where the projector itself does not block the view of the audience, for instance, on a floor, or on a ceiling in a suspended state. In that case, there occurs the trapezoid distortion. To avoid the trapezoid distortion on the projected image, there have been proposed various kinds of countermeasures, for instance, an optical compensation method and an electric compensation method. Actually, the optical compensation method has been put into practical use.

However, in the optical compensation method, there is a problem that the production cost of the projector becomes very high.

In the electrical compensation method, there is one in which the original image formed on the pixel array of the liquid crystal valve is preliminarily deformed thereon by reducing the number of the pixels from that of the original image. However, this method has problems that it is difficult to obtain a largely magnified projected image having a high quality and to reduce the production cost of the projector.

SUMMARY OF THE INVENTION

Accordingly, a general object of the present invention is to provide an image processing apparatus in which the above disadvantages have been eliminated.

A more specific object of the present invention is to provide the image processing apparatus capable of realizing a projector having a low cost and capable of projecting a high quality image.

Another more specific object of the present invention is to provide an image projection apparatus for projecting an image on a screen which is off perpendicular to an optical axis of an optical projection system of the apparatus, the apparatus comprising: light source for generating a beam of light; image forming means for forming a pre-distorted image thereon to be projected on the screen using the light source and the optical projection system; and means for producing a signal for the pre-distorted image to be formed on the image forming unit from an original signal of a geometrically normal picture inputted to the apparatus, the signal producing means calculating pixel information every a pixel of the pre-distorted image from picture information of a plurality of pixels included in the original signal of geometrically normal picture so that the pre-distorted image exhibits a normal picture substantially identical in geometrical proportion to the geometrically normal picture of the original signal when the pre-distorted image is projected on the screen.

Another and more specific object of the present invention is to provide an image processing apparatus for use with an image projector for projecting an original image having a predetermined picture outline formed on an image forming section of the image projector on a screen by using a projection lens of the projector, the image forming section being composed of a plurality of pixels which are disposed in a two dimensional array, wherein the image processing apparatus generates a preliminarily deformed original image corresponding to an original image on the image forming section so that a picture outline of a first projected image projected on the screen by the projection lens of which an optical axis is declined to a normal line of the screen, becomes similar to a picture outline of a second projected image projected on the screen by the projection lens of which the optical axis accords with the normal line of the screen without a trapezoid distortion, the image processing apparatus comprising: analogue-digital converting means for converting image signal capable of forming an image having a predetermined picture outline to digital signals by a predetermined sampling interval so as to obtain digital image data corresponding to a pixel array of the original image; image memory means for successively storing the digital data from the analogue-digital converting means therein; arithmetic means for performing arithmetic of a specified deformed coordinate position among deformed coordinate positions of the first projected images on the screen on the basis of the original image by using relative formulas defining a relative positional relation of an identical coordinate position of the original image between the coordinate positions of the first and second projected images on the screen with respect to the specified deformed coordinate position; black data establishing means for establishing black data to an image data of the specified deformed coordinate position among the deformed coordinate positions of the first projected image when the specified coordinate position obtained as a result of the arithmetic from the arithmetic means is found out to be positioned outside of the picture outline of the first projected image on the screen; image data reading means for reading out image data of four pixels nearby the specified deformed coordinate position among the deformed coordinate positions by scanning in a normal scanning direction on a two dimensional array of the original image having the predetermined picture outline so as to sequentially read out the image data of the four pixel (2×2) when the specified deformed coordinate as a result of the arithmetic from the arithmetic means is found out to be positioned inside of the picture outline of the first projected image on the screen; and means for obtaining image data of the specified deformed coordinate position by calculating an average of sum of arithmetic results which are obtained by giving a weight to each of image data of the four pixels, the weight being corresponding to a positional deviation value from the specified deformed coordinate position to the respective coordinate positions of the four pixels.

Another and more specific object of the present invention is to provide an image processing apparatus for use with an image projector for projecting an original image having a predetermined picture outline formed on an image forming section of the image projector on a screen by using a projection lens of the projector, the image forming section being composed of a plurality of pixels which are disposed in a two dimensional array, wherein the image processing apparatus generates a preliminarily deformed original image corresponding to an original image on the image forming section so that a picture outline of a first projected image projected on the screen by the projection lens of which an optical axis is declined to a normal line of the screen, becomes similar to a picture outline of a second projected image projected on the screen by the projection lens of which the optical axis accords with the normal line of the screen without a trapezoid distortion, the image processing apparatus comprising: analogue-digital converting means for converting image signal capable of forming an image having a predetermined picture outline to digital signals by a predetermined sampling interval so as to obtain digital image data corresponding to a pixel array of the original image; means for sequentially reading out four image data of four pixels as an object of data processing at the same time from sequential digital image data corresponding to a two-dimensional pixel array of the original image using delay line means; means for preliminarily preparing data of values of column coordinate positions in deformed coordinate positions of the first projected image and data obtained on the basis of a ratio of a length of the first projected image to a length of the second projected image in a width direction corresponding to an identical horizontal scanning line in the original image with respect to respective plural declined angles which are preliminarily prepared every angle defined as between the optical axis of the projection lens and the normal line of the screen, each of the deformed coordinate positions being obtained by using relative formulas defining a relative positional relation of an identical coordinate position of the original image between the coordinate positions of the first and second projected images on the screen; arithmetic means for calculating for the four image data as the object of the data processing by using the data of values of the column coordinates and the data obtained from the ratio; FIFO line memory means for storing selectively effective image data therein every a horizontal scanning line among the image data obtained from the arithmetic means as a result of the arithmetic, the effective data being capable of projecting the first projected image on the screen; FIFO image memory means for storing the effective data read out from the FIFO line memory in such a time relation as image data situated in a middle section are projected on a middle section of the first projected image in the direction of the width on the screen; and means for reading out the image data stored in the FIFO image memory in a time relation as a lowest position of the first projected image on the screen becomes a predetermined position.

Another and more specific object of the present invention is to provide an image processing apparatus for use with an image projector for projecting an original image having a predetermined picture outline formed on an image forming section of the image projector on a screen by using a projection lens of the projector, the image forming section being composed of a plurality of pixels which are disposed in a two dimensional array, wherein the image processing apparatus generates a preliminarily deformed original image corresponding to an original image on the image forming section so that a picture outline of a first projected image projected on the screen by the projection lens of which an optical axis is declined to a normal line of the screen, becomes similar to a picture outline of a second projected image projected on the screen by the projection lens of which the optical axis accords with the normal line of the screen without a trapezoid distortion, the image processing apparatus comprising: analogue-digital converting means for converting image signal capable of forming an image having a predetermined picture outline to digital signals by a predetermined sampling interval so as to obtain digital image data corresponding to a pixel array of the original image; means for sequentially reading out four image data of four pixels as an object of data processing at the same time from sequential digital image data corresponding to a two-dimensional pixel array of the original image using delay line means; means for preliminarily preparing data of values of column coordinate positions in deformed coordinate positions of the first projected image and data obtained on the basis of a ratio of a length of the first projected image to a length of the second projected image in a width direction corresponding to an identical horizontal scanning line in the original image with respect to respective plural declined angles which are preliminarily prepared every angle defined as between the optical axis of the projection lens and the normal line of the screens each of the deformed coordinate positions being obtained by using relative formulas defining a relative positional relation of an identical coordinate position of the original image between on the coordinate positions of the first and second projected images in the screen; arithmetic means for calculating for the four image data as the object of the data processing by using the data of values of the column coordinates and the data obtained from the ratio; FIFO line memory means for storing selectively effective image data therein every a horizontal scanning line among the image data obtained from the arithmetic means as a result of the arithmetic, the effective data being capable of projecting the first projected image on the screen; and means for reading out the effective data stored in the FIFO line memory in such a time relation as image data situated in a middle section are projected on a middle section of the first projected image in the direction of the width on the screen.

Other objects and further features of the present invention will be apparent from the following detailed description.

BRIEF DESCRIPTION OF THE DRAWINGS

FIG. 4 (b) is a plan view for explaining shapes of projected images on both the first screen and the second screen;

DETAILED DESCRIPTION OF THE PREFERRED EMBODIMENTS

A description is now given of a first embodiment of an image processing apparatus of the present invention with reference to FIGS. 1 and 3 through 7.

Figure 1:
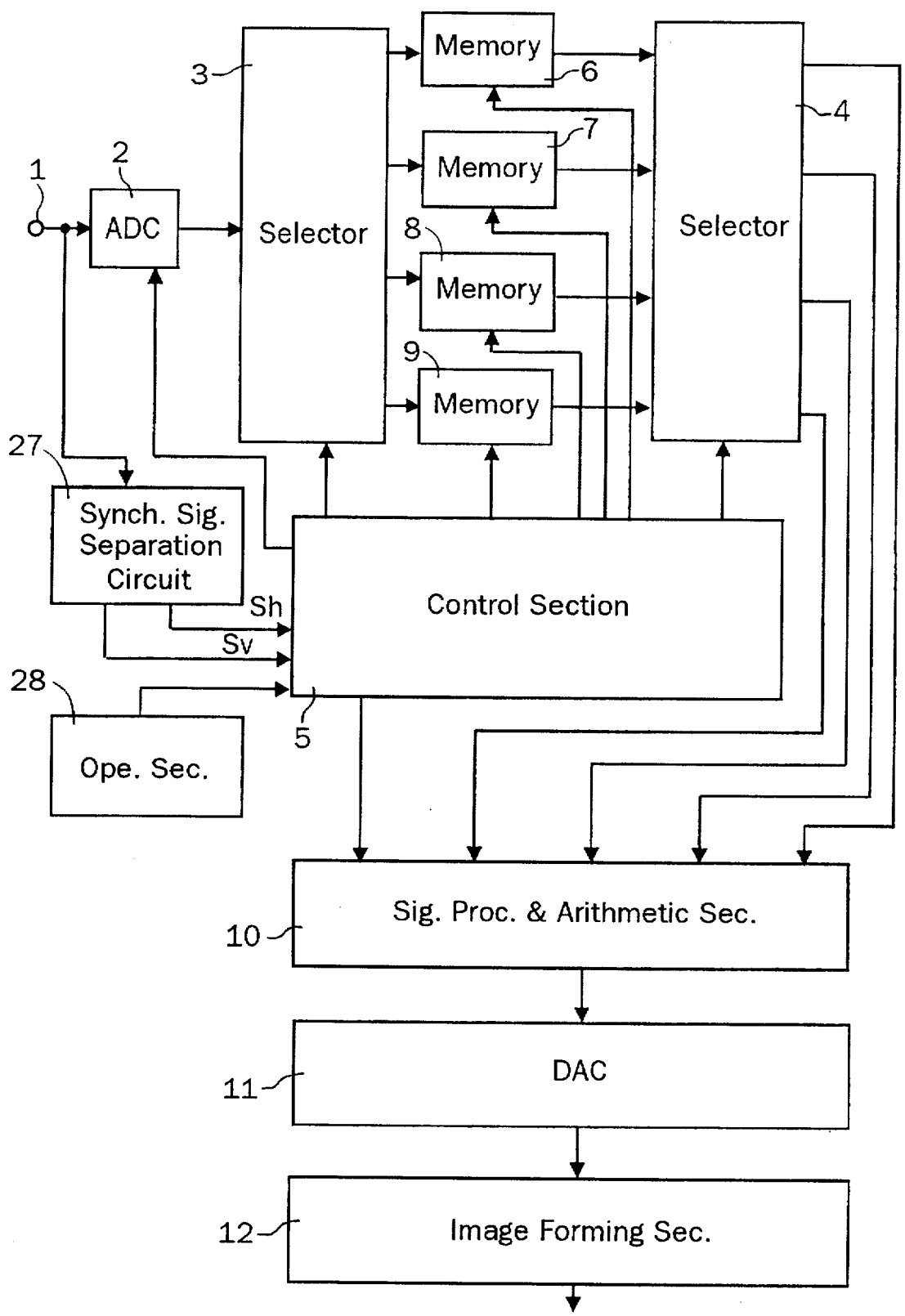
FIG. 1 is a diagram showing a general construction of an image processing apparatus of a first embodiment in the present invention.
Figure 3:
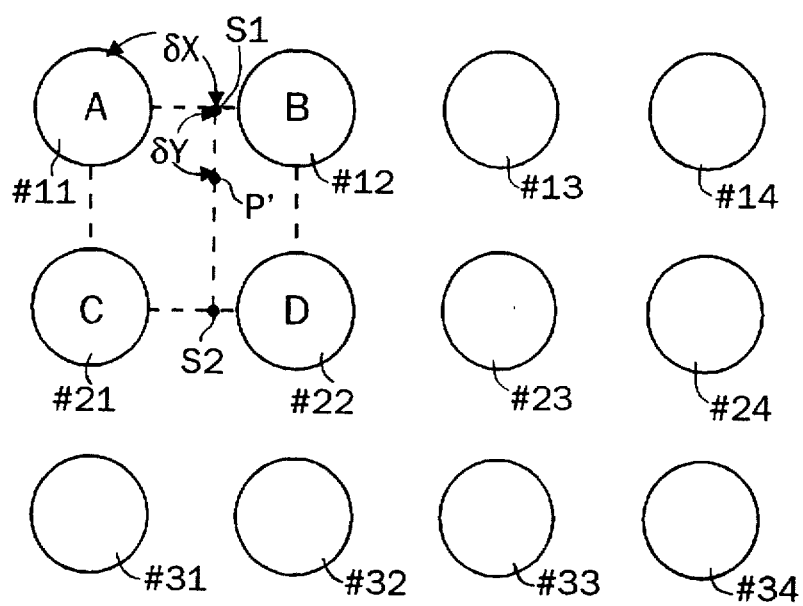
FIG. 3 is an explanatory view of a method how to determine image data in a deformed coordinate position.
Figure 5:
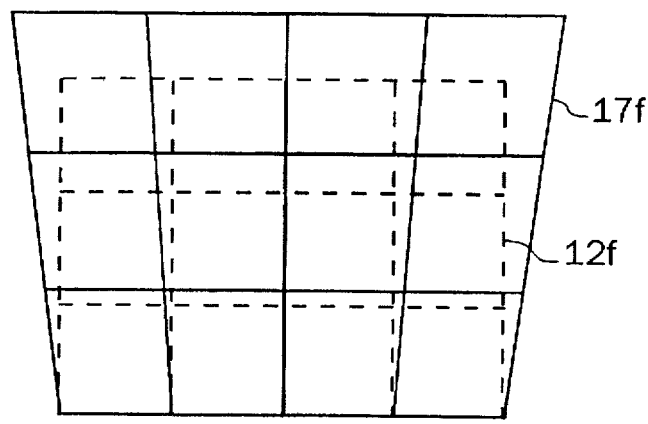
FIG. 5 is a plan view for explaining a relation between an original image formed on the image forming section having a two-dimensional array and a projected image of the original image on the first screen by the projector lens.
Figure 6:
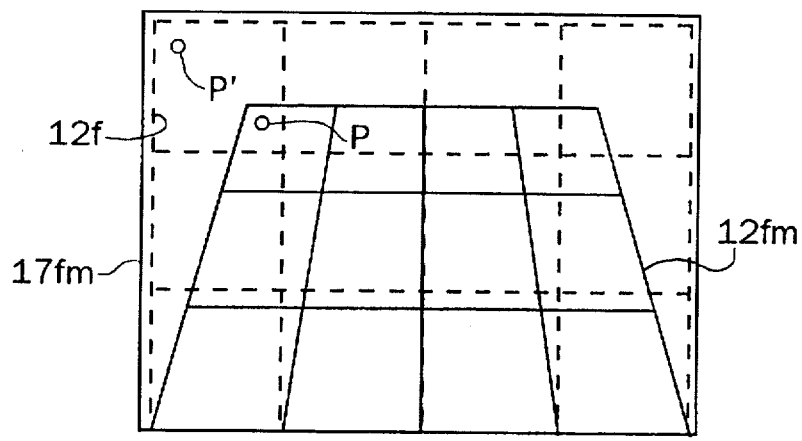
FIG. 6 is a plan view for explaining a relation between a deformed original image formed on the surface of the image forming section which is parallel to the principal plane of the optical lens and a projected image of the deformed original image on the second screen.
Figure 7:
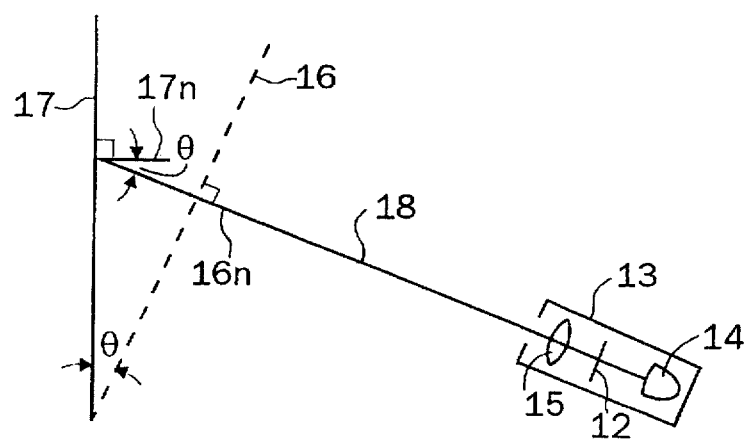
FIG. 7 is a side view for explaining an outline of the construction of the projector.

FIG. 1 is a diagram showing a general construction of an image processing apparatus of a first embodiment in the present invention;

FIG. 3 is an explanatory view of a method how to determine image data in a deformed coordinate position;

FIG. 4 (a) is a side view for explaining shapes of projected images on both a first screen and a second screen, wherein the first screen is defined such that a normal line thereof accords with an optical axis of a projection lens of the projector and the second screen is defined as such that a normal line thereof does not accord with the optical axis of the projection lens;

FIG. 4 (b) is a plan view for explaining shapes of projected images on both a first screen and a second screen;

FIG. 5 is a plan view for explaining a relation between an original image formed on the image forming section of the a projector having a two-dimensional array and a projected image of the original image on the first screen by the projector lens;

FIG. 6 is a plan view for explaining a relation between a deformed original image formed on the surface of the image forming section which is parallel to the principal plane of the optical lens and a projected image of the deformed original image on the second screen, and FIG. 7 is a side view for explaining an outline of the construction of the projector.

Referring to FIG. 7, an original image (not shown) formed on an image forming section 12 of the projector 13 is projected as a magnified projected image (not shown) on a first screen 16 shown with a dotted line of which a normal line accords with an optical axis 18 of a projection optical system (or a projection lens 15) of the projector 13, or is projected on a second screen 17 shown with a solid line of which a normal line 17n does not accord with the optical axis 18 of the projection lens 15.

Specifically, in FIG. 7, a numerical character 13 designates the projector, 12 an original image forming section (referred to as an image forming section) for forming an original image to be projected on a screen, 14 a light source, 15 a projection lens for projecting an original image (not shown) formed on the image forming section 12 onto the screen. The projection lens 15 is disposed so that the principal plane of thereof is parallel to the principal plane of the image forming section 12.

When a light beam emitted from the light source 14 is intensity-modulated by the original image formed on the image forming section 12 and is focused on the first screen 16 (or the second screen 17) by the projection lens 15, a larger magnified image than the original image is projected on the first screen 16 (or the second screen 17).

The numeral 18 designates an optical axis of the projection optical system (or the projection lens) of the projector 13, 16 the first screen which is provided so that a normal line thereof accords with the optical axis 18 of the projection lens 15, and 17 the second screen which is provided so that the normal line 17n thereof is inclined to the optical axis 18 of the projection lens by a declined angle "θ" in a perpendicular direction or in a counter-clockwise direction in the side view of FIG. 7.

There does not occur a trapezoid distortion (a keystone distortion) in the above projected image on the first screen 16, but the trapezoid distortion occurs in the projected image on the second screen 17 as shown in FIG. 5.

Specifically, in FIG. 5, a FIG. 12f having a net shape shown with dotted lines shows the original image formed on the image forming section 12, and a FIG. 17f having a trapezoid shape shown with solid lines shows the projected image having a trapezoid distortion on the second screen 17 from the original image. In proportion to the declined angle "θ" between the normal line of the screen 17 and the optical axis 18, the state of the trapezoid distortion is varied.

In the present invention, in order to eliminate the trapezoid distortion from the projected image on the second screen 17, a deformed (pre-distorted) original image is utilized instead of the original image to be formed on the image forming section 12. The deformed original image can be obtained by preliminarily giving an inverse distortion of the trapezoid distortion which will be formed on the second screen 17, to the original image.

In FIG. 6, the FIG. 12f having a net shape shown with dotted lines shows a figure of the original image to be formed on the image forming section 12 as well as the FIG. 12f shown in FIG. 5. This FIG. 12f of the original image is projected as a similar figure to the original image on the first screen 16.

A trapezoid figure 12fm shown with solid lines shows a figure of a deformed original image. This deformed original image is preliminarily deformed to allow itself to be projected as a similar figure having the correct shape to the original image on the second screen 17.

Further, in FIG. 6, a FIG. 17fm shown with solid lines, which is shown so as to contact with the FIG. 12f, shows a projected image of the deformed original image 12fm projected on the screen 17. The FIG. 17fm of the projected image is shown as large as the same magnification with respect to the original image projected on the first screen 16.

The FIG. 12fm of the deformed original image is positioned within the FIG. 12f on the image forming section 12.

The larger, the inclined angle "θ", the smaller, the area of the trapezoid FIG. 12fm corresponding to the deformed original image.

Specifically, when the inclined angle "θ" is zero, a picture outline of the original image is as large as that of the FIG. 12f of the original image. On the other hand, when the inclined angle "θ" is increased, the FIG. 12fm of the deformed original image is decreased compared with one on the first screen 16w and is included within the area of the FIG. 12f of the original image. Thus, when the image forming section 12 is made of, for instance, the liquid crystal light valve, wherein predetermined number of pixels are arranged in a two-dimensional array, the number of the pixels within the trapezoid FIG. 12fm of the deformed original image is determined in accordance with the area of the trapezoid FIG. 12fm, i.e., the value of the inclined angle "θ" because the number of the pixels provided within the FIG. 12f of the original image is a fixed value.

On the other hand, when the deformed original image having the trapezoid FIG. 12fm is projected on the second screen 17 by the projection lens 15, the projected image of thereof is shown in such a magnified state as the FIG. 17fm.

Thus, the pixels of the image forming section 12 existing in an area interposed between an outline of the trapezoid FIG. 12fm of the deformed original image and an outline of the FIG. 12f of the the original image should be filled with black pixels because this area corresponds to an area other than the projected image 17fm of the deformed original image to be projected on the screen 17.

As mentioned in the foregoing referred to FIG. 6, when the deformed original image having a picture outline shown with the trapezoid FIG. 12fm is projected on the second screen 17 as a projected image having a picture outline shown with the FIG. 17fm, a pixel at a position of a point "P" (referred to a position "P") in the deformed original image is projected at a position of a point "P'" (referred to as a position "P'") in the FIG. 17fm of the projected image of the deformed original image. In other words, the position "P'" corresponds with one of the pixels among the pixels of the deformed original image is to be projected on the screen 17.

In summary, the deformed original image having the trapezoid FIG. 12fm is projected by the projection lens 15 on the second screen 17 as the projected image having the picture outline shown with the FIG. 17fm. This projected image of the deformed original image shown in FIG. 6 has an identical proportion with the projected image of the original image which is projected on the screen 17 without the trapezoid distortion (projected normal to the screen 17). The pixel at the position "P" in the deformed image shown in the trapezoid FIG. 12fm is projected at the position "P'" in the pixel area of the FIG. 17fm which is projected in a magnified state.

Figure 4A:
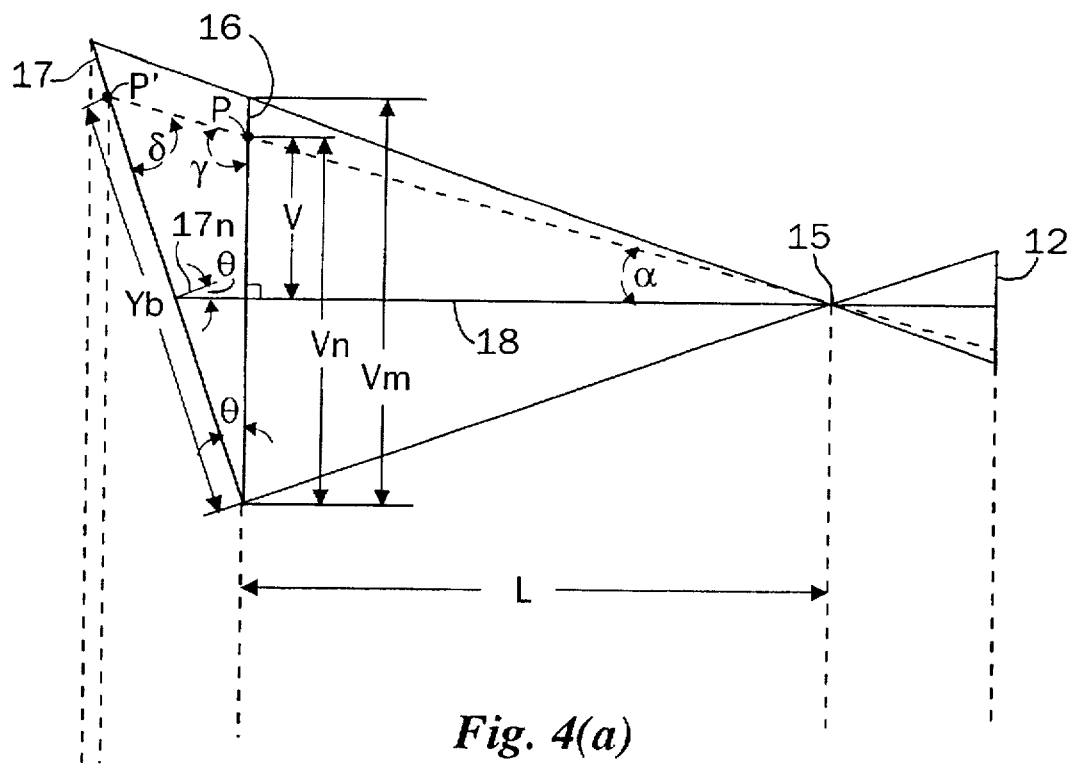
FIG. 4 (a) is a side view for explaining shapes of projected images on both a first screen and a second screen, wherein the first screen is defined such that a normal line thereof accords with an optical axis of a projection lens of the projector and the second screen is defined as such that a normal line thereof does not accord with the optical axis of the projection lens.
Figure 4B:
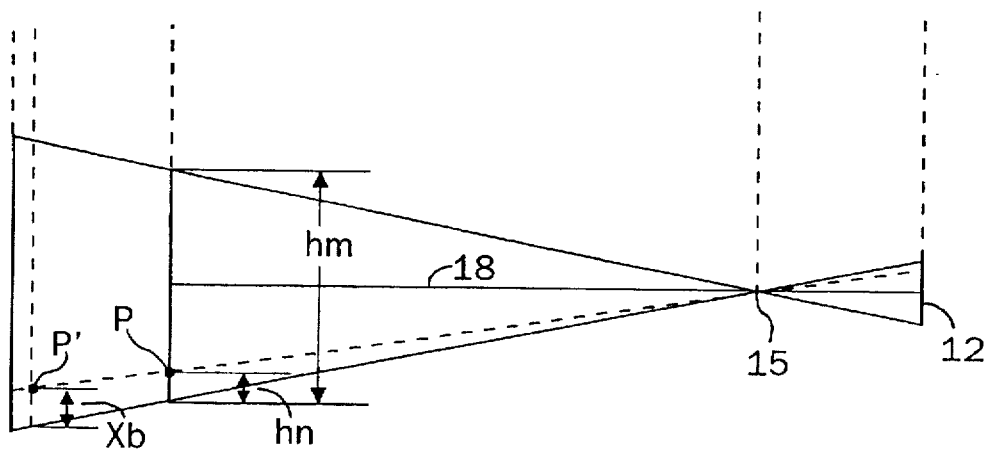

Next, a description is given of a relation between the positions "P" and "P'" in reference with FIGS. 4(a) and 4(b).

In FIGS. (4a) and (4b), there are shown the image forming section 12 of the projector 13, the projection lens 15, the first screen 16 (imaginary screen) and the second screen 17, wherein the optical axis 18 of the projection lens 15 is depicted as a horizontal line. FIG. (4a) is a side view and FIG. 4(b) is a plan view of FIG. (4a). As shown in FIG. 4(a), the first screen 16 is provided so that the normal line of the first screen 16 accords with the optical axis 18 of the projector 13, and the second screen 17 is provided so that the normal line 17n of the second screen 17 is declined by "θ" to the optical axis 18 in the side view of the FIG. 4(a).

In FIGS. 4(a) and 4(a), the bottoms of the first and second screens 16, 17 are situated at the same position. In FIGS. 4(a) and 4(b), the image information projected at the position "P" on the first screen 16 is also projected at the position "P'" on the second screen 17, wherein the position "P'" is defined as an intersecting point of a line passing through both a center of the projection lens 15 and the position "P", and the second screen 17.

A positional relation (coordinate) between the position "P" and the position "P'" can be geometrically obtained by using the angles shown with α, γ, δ, θ and distances shown with L, Yb, V, Vn, Vm, Xb, hn, hm, as follows.

$\alpha = \tan^{-1}(V/L)$ $\gamma = \pi/2 + \alpha$ $\delta = \pi/2\theta - \alpha$ $V = Vn - Vm/2$ $$Yb = Vn\sin\gamma/\sin\delta \qquad (1)$$
$$= Vn \cdot [\sin\{\pi/2 + \tan^{-1}(Vn - Vm/2)/L\}/\sin\{\pi/2 - \theta$$
$$= -\tan^{-1}(Vn - Vm/2)/L\}]$$

$$Xb = hn \cdot (L + Yb \sin\theta)/L \qquad (2)$$

When the deformed original image is projected on the first screen 16, a positional relation between the position "P" on the first screen 16 and the position "P'" on the screen 17 is expressed by using the formulas (1) and (2).

Accordingly, the formulas (1) and (2) can be used for obtaining a coordinate of the position "P" on the second screen 17 by causing coordinates of pixels of the original image projected on the second screen 17 without trapezoid distortion to be a standard coordinate system.

As mentioned in the foregoing, the projected image having no trapezoid distortion on the second screen 17 obtained by projecting the deformed original image is a magnified projected image of the deformed original image.

Thus, when the image forming section 12 is made of a liquid crystal panel, wherein predetermined numbers of pixels are respectively disposed at predetermined positions in a two-dimensional array thereon as shown in the FIG. 12f, the pixels used in the deformed original image are reduced within the area of the trapezoid FIG. 12fm corresponding to the deformed original image. These pixels are only used to obtain the magnified projected image having a rectangular picture outline on the screen 17.

Accordingly, upon forming the outline of a projected image similar to the picture outline of the FIG. 12f on the second screen 17 by using the pixels disposed in the two-dimensional array within the picture outline shown with the FIG. 12f in FIG. 6, when an image having the same picture outline as that of the projected image on the screen 17 is formed on the second screen 17 by projecting the deformed original image composed of the pixels within the picture outline of the trapezoid FIG. 12fm, a pixel domain interposed between the picture frames shown with the FIG. 12f and shown with the FIG. 12fm is projected outside the picture outline of the projected image on the screen 17.

Respective pixels corresponding with respective pixel data on the basis of one to one, display one pixel data on the basis of one unit.

As seen from the formulas (1) and (2), generally, the relation between the pixel at the position "P" and the pixel at "P'" can not be expressed in an integer relation.

It is assumed here that a projected image having the picture outline similar to the FIG. 12f having square nets shown in FIG. 6 is projected on the second screen 17 without trapezoid distortion and that an image having the same picture outline as the above projected image is also formed on the second screen 17 by projecting the deformed original image having the trapezoid FIG. 12fm by the projection lens.

An identical part in the above two projected images on the second screen 17 may have a different pixel data to each other because the projected image of the deformed original image is made of the pixels in the area of the trapezoid FIG.

12/m, on the other hand, the projected image of the original image is made of the pixels in the area of the FIG. 12f.

Thus, the projected image made of the deformed original image is degraded in the quality.

FIG. 3 shows a figure of a pixel array for explaining the method to solve the above problem in the present invention, wherein #11, #12, . . . , #33, #34 etc. show an example of a part of the pixel array on the second screen 17 when the pixel array consisting of the original image having a two-dimensional pattern is projected on the second screen 17 without the trapezoid distortion.

In FIG. 3, #11, #12, #13 . . . , #21, #22, #23 . . . , #31, #32, #33 . . . , #41, #42, #43, . . . , etc. show pixel arrays in a row direction, and #11, #21, #31 . . . , #12, #22, #32 . . . , #13, #23, #33 . . . , #14, #24, #34, . . . , etc. show pixel arrays in a column direction.

When the point "P'" in FIG. 3 on the screen 17 is found out by using the formulas (1) and (2) that it is positioned within the trapezoid FIG. 12/m on the image forming section 12, an image data "P's" thereon corresponding to the point "P'" on the second screen 17 is determined as follows.

For simplicity, assuming that the point "P'" accords with #11 on the second screen 17. The position (address) of the pixel on the image forming section 12 corresponding to the point "P'" is expressed with an integer part (X, Y) and a dismal fraction part (δX, δY) by using the formulas (1), (2) when it does not accord with the #11 on the trapezoid FIG. 12/m on the image forming section 12. The integer part (X,Y) of the pixels is shown by using the coordinate of the pixel #11, and the dismal part is shown as δX, δY as shown in FIG. 3 when the origin of the coordinate is defined as the position of the pixel #11.

At that time, the image data "P's" given to the pixel on the image forming section 12 is obtained as follows:

$$S1 = B \cdot \delta X + A(1-\delta X) \quad (3)$$

$$S2 = D \cdot \delta X + C(1-\delta X) \quad (4)$$

$$P's = S2 \cdot \delta Y + S1(1-\delta Y) \quad (5)$$

wherein A, B, C, D designate respective pixel data of the pixels of #11, #12, #21, #22 nearby the position "P'" by causing the upper left pixel, i.e., the pixel #11, as the origin. In other words, the pixel corresponding to the position "P'" is surrounded by the four pixels on the image forming section 12 corresponding to #11, #12, #21, #22 on the second screen 17. The δX and δY designate the coordinate of decimal fraction part of the pixel corresponding to the position "P'".

Thus, the image data "P's" is given to the pixel on the image forming section 12 corresponding to the point "P'".

As mentioned above, the image data "P's" of the position "P" on the deformed original image on the image forming section 12 corresponding to the position "P'", for instance, #11 on the screen 17 can be obtained by ① calculating the position (address) of the pixel #11 on the image forming section 12 by using the formulas (1) and (2), and ② by using X coordinates and Y coordinates of #11 together with decimal fraction parts δX, δY thereof by causing the upper left pixel, i.e., the pixel #11, to be the origin (0,0), and ③ by using the four pixel data A, B, C, D designating respective pixel data of the pixels of #11, #12, #21, #22 nearby the position "P'".

After that, the image data "P's" of the position "P" on the deformed original image on the image forming section 12 corresponding to the position "P'", for instance, #12 on the screen 17 can be obtained by ① calculating the position (address) of the pixel #12 on the image forming section 12 by using the formulas (1) and (2), and ② by using X coordinates and Y coordinates of #12 together with decimal fraction parts δX, δY thereof by causing the pixel #11 to be the origin (0,0), and ③ by using the four pixel data A, B, C, D designating respective pixel data of the pixels of #12, #13, #22, #23 nearby the position "P'".

The same calculations follows with respect to the respective pixels.

The calculation of the image data "P's" of position "P" on the deformed original image on the image forming section 12 corresponding to the position "P'" on the second screen 17 is performed by obtaining the average of sum of weight values on the basis of the distances from the four pixels (coordinate positions and the deviations from the coordinate positions). Thus, it is possible to give a correct image data to the pixel corresponding to the position "P'" resulting in obtaining an projected image having a high quality.

Depending on a position of the position "P'", the number of the pixels to be used for obtaining the "P's" becomes substantially one, two, or four. However, in the present invention, the calculation is always performed on the basis of the four pixels.

Next a description is given to an image processing apparatus of a first embodiment of the present invention.

FIG. 1 is a diagram showing a construction of an image processing apparatus of a first embodiment in the present invention.

In FIG. 1, a numerical character 1 designates an input terminal for image signals (analogue). The image signals inputted to the input terminal 1 is converted into digital image signals (digital image data) having a quantization level of predetermined bit number by an analogue-digital converter 2.

Further in FIG. 1, numerals 3 and 4 denote selectors (data selectors), 5 a control section containing a calculation part, 6 to 9 memories (random access memory), 10 a signal processing and arithmetic section, 11 a digital-analogue converter, 12 an image forming section for forming an original optical image thereon by causing the deformed original image signals generated by the image processing apparatus of the present invention to input thereto, 27 a synch signal separation circuit and 28 an operation section having an input section of signals from the outside.

The four memories 6 to 9 are random access memories (RAM) for storing the four pixel data which are used to calculate the image data of the pixel on the image forming section 12 corresponding to a specified position such as the position "P'"on the screen 17 on the basis of the distances from the four coordinates surrounding the specified position "P'" on the screen 17.

There are given or stored into the memory 6 the pixel data of the two-dimensional array of odd rows and odd columns (#11, #13, #31, #33. . . in FIG. 3) among the digital data forming the original data outputted from the analogue-digital converter 2 by the selective operation of the selector 3.

Into the memory 7, there are given or stored the pixel data of the two-dimensional array of odd rows and even columns (#12, #14, #32, #34. . . in FIG. 3) among the digital data forming the original image by the selective operation of the sector 3.

Into the memory 8, the pixel data of the two-dimensional array with even rows and odd columns (#21, #23, . . . in FIG. 3), and into the memory 9, the pixel data of the two-dimensional array of even rows and even columns (#22, #24, . . . in FIG. 3) as well.

The control section 5 performs a control of switching operation of the selector 3 and control operations of writing and reading operations for the respective memories 6 to 9.

The control section 5 is constructed so as to be equipped with, for instance, microprocessors, read-only memories (ROM), digital signal processors (DSP) and arithmetic units.

From the control section 5, a control signal is outputted to the selector 3 for allowing the selector 3 to perform a selective operation in such a manner that the digital data of an image picture corresponding to the pixels of the two-dimensional array outputted from the analogue-digital converter 2 are distributed to the four memories 6 to 9 in the above mentioned manner. Further, the control section 5 performs a control operation as such that a set of the four pixel data, for instance, [#11, #12, #21, #22], [#12, #13, #22, #23], [#13, #14, #23, #24], nearby the position "P'" can be simultaneously read out from pixel data stored in the four memories 6 to 9 to obtain the pixel of the image data corresponding to the position "P'" on the screen 17 by giving a control signal to the selector 4.

Further, the control section 5 is given horizontal scanning interval signals "Sh" and vertical scanning interval signals "Sv" synchronously separated from the image signal by the synch signal separation circuit 27 and such numerical information inputted from the input device (key board, mouse, switch) of the operation section 28 as the declined angle θ between the optical axis 18 of the projection lens 15 and the normal line of the screen 17, and the distance "L" from the principal plane of the projection lens 15 to the screen 16.

Further, the control section 5 performs the calculation of the pixel corresponding to the position "P'" using the formulas (1) and (2) about the respective pixels.

Further the control section 5 performs the calculating operations of the coordinates (address) of the data stored in the memories 6 to 9 corresponding to the position "P'".

These calculating operations are performed in the control section 5, for instance, by using a counter for conducting counting operation in such a manner that the sampling pulses supplied to the analogue-digital converter 2 from the control section 5 is made as count pulses to be counted, and a address arithmetic circuit for conducting the coordinate (address) calculation using predetermined parameters by causing the count values from the counter to be as coordinate (address) values of the sequential respective pixels in respective images.

Specifically, the horizontal scanning interval signals "Sh" (horizontal synchronizing signals or horizontal driving signals) supplied to the input terminal 1 give the coordinate (address) information of the respective rows (horizontal scanning line) in the two-dimensional array of the respective image pictures. The vertical scanning cycle signals (vertical synchronizing signals or vertical driving signals) are used to reset the above counter after the counting operation corresponding to all the pixels of the respective image pictures has been finished.

The count values outputted from the counter are such values as showing the coordinate (address) value of the respective pixels in the two-dimensional array of the respective image pictures. The respective coordinate (address) values are corresponding to #11, #12, #13 . . . which are used for distinguishing the values from each other in the horizontal scanning line.

The count values outputted from the counter are supplied to the address arithmetic circuit. In the address arithmetic circuit, after determining the coordinates (address) of the pixels corresponding to the position "P'" by using such parameters inputted from the operation section 28 as the declined angle θ between the optical axis 18 of the projection lens 15 and the normal line of the screen 17 (16), and the distance "L" from the principal plane of the projection lens 15 to the screen 16 and using the formulas (1) and (2), the coordinate (address) information of the pixel corresponding to the position "P'" is given to the signal processing and arithmetic section 10.

In the signal processing and arithmetic section 10, when the pixel on the image forming section 12 corresponding to the position "P'" is found out to be situated in the pixel area corresponding to outside of the picture outline of the projected image on the second screen 17, the signal processing and arithmetic section 10 outputs the image data to the digital-analogue converter #11 without another calculation so that the pixel corresponding to the position "P'" has the black data. When the position "P'" is situated in the pixel area corresponding to inside of the picture outline of the projected image on the screen 17, the signal processing and arithmetic section 10 outputs the picture image data obtained on the basis of the formulas (3) to (5) to the digital-analogue converter 11.

Incidentally, as mentioned in the foregoing referred to FIG. 3, the calculation of the image data of the pixel corresponding to the position "P'" is performed by using the formulas (3) to (5) and a set of the four pixels read out from the four memories 6 to 9 on the basis of a predetermined relation.

Thus, the geometric relation among the four pixels shown with [#11, #12, #21, #22], [#12, #13, #22, #23], [#13, #14, #23, #24], . . . stored in the four memories 6 to 9 are determined by the selective operation of the selector 4 on the basis of the control signal from the control section 5.

When the calculating speed of a multiplier in the signal processing and arithmetic section 10 is too small to satisfy the required image data processing speed, it is effective to employ a look-up table in which the calculation results of the fixed part in the formulas (3) to (5) are preliminarily stored in a ROM, to improve the speed thereof.

The calculation results from the signal processing and arithmetic section 10 are displayed on the image forming section 12 through the digital-analogue converter 11 as the deformed original image. When the deformed original image on the image forming section 12 is projected on the screen 17 by the projection lens 15 of which the optical axis 18 is declined to the normal line 17n of the screen 17 by an acute angle, it is possible to form the projected image on the screen 17 without the trapezoid distortion.

Further, it is possible to obtain the high quality projected image without abrupt changes in the projected image contents, even when the deformed original image has a reduced number of the pixels compared with the original image and is projected on the screen 17 in a magnified state, because the calculation of the pixel data of the position "P" on the deformed original image corresponding to the position "P'" on the screen 17 has been carried out so as to obtain the average of sum of weight values obtained on the basis of the distances (coordinates and the deviations from the coordinates) between the position "P" and the four pixels surrounding the position "P".

In the image processing apparatus of the first embodiment in the present invention, address input type random access memory (RAM) are employed as the memories 6 to 9. As mentioned in the foregoing, it is necessary to read out the data of each of the pixel data from the four memories 6 to 9, i.e., the four pixel data at the same time. Thus, in the actual construction of the apparatus, a pair of RAMs per each memory are prepared for the respective memories 6 to 9. The pair of the RAMs are used in such a manner that they are alternately switched to perform a reading operation or a writing operation in order. Thus, it requires total eight RAMs for its construction. When the number of the pixels of the liquid crystal panel to be used is made 640×480, and the liquid crystal panel is operated under the vertical scanning frequency of 60 Hz, it requires 24 units of RAMs each having a high speed of 1M bits (a cycle of not more than 30 nanoseconds).

However, such a RAM capable of high speed operation is very expensive at present, setting aside the price in the future. Thus there poses a problem that the cost of the apparatus employing a lot of such RAMs becomes very high.

Figure 2:
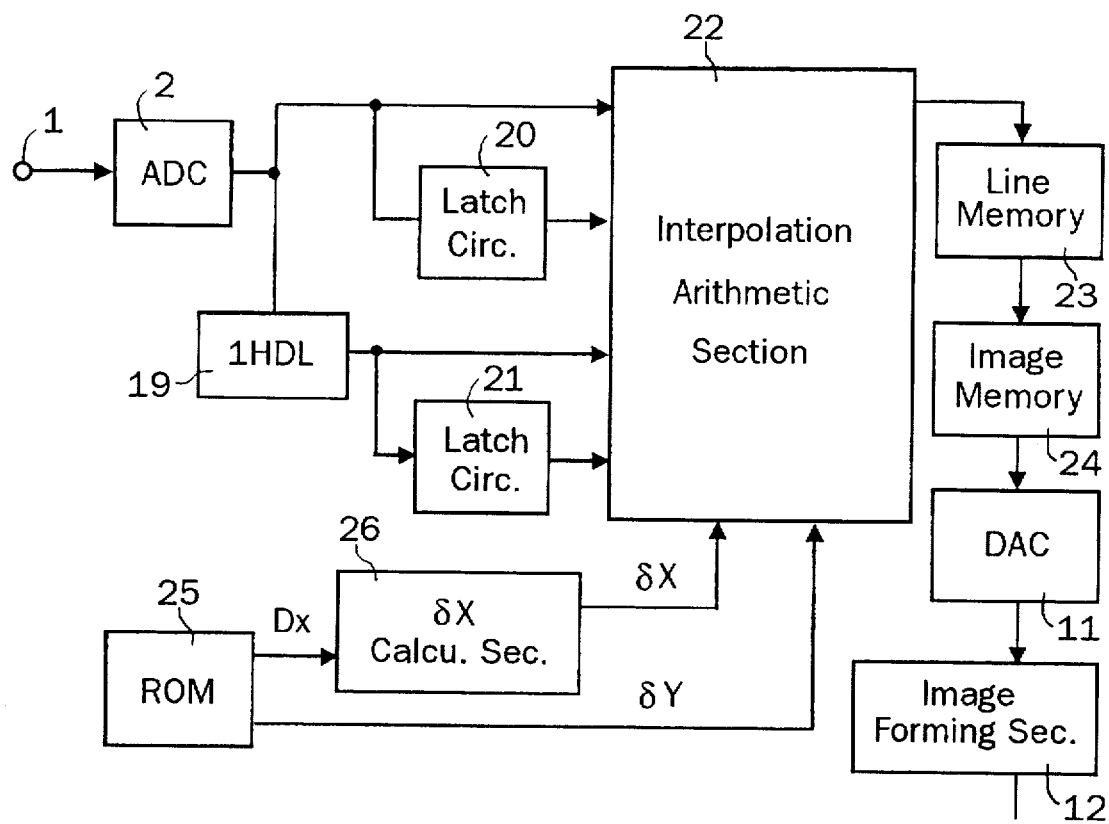
FIG. 2 is a diagram showing a general construction of a second embodiment in the present invention.

In an image processing apparatus shown in FIG. 2 of a second embodiment of the present invention, the above problem is eliminated.

FIG. 2 is a block diagram of an image processing apparatus of a second embodiment of the present invention.

Next, a description is given to a second embodiment of the image processing apparatus of the present invention.

In the image processing apparatus shown in FIG. 2, an image signal (analogue signal) inputted to an analogue-digital converter (A-D converter) 2 through an input terminal 1 is converted into digital image signals (referred to as digital image data) each having a quantization level of predetermined bit number (8 bits in this embodiment)and are given to an interpolation arithmetic section 22 and a latch circuit 20 and a delay circuit 19 of 1-horizontal scanning period (referred to as 1H delay circuit 19).

Further, the digital image data outputted from the latch circuit 20 is given to the interpolation arithmetic section 22.

The digital image data delayed by 1H by the 1H delay circuit 19 is given to the interpolation arithmetic section 22 and another latch circuit 21, and the digital image data outputted from the latch circuit 21 is given to the interpolation arithmetic section 22.

Thus, into the interpolation arithmetic section 22, the following digital image data are simultaneously given:

(1) The present digital image data, for instance, of the pixel #22 shown in FIG. 3 directly and presently supplied from the analogue-digital converter 2.

(2) The digital image data of the pixel #21 shown in FIG. 3. This data is prepared by causing the digital image data which has been outputted from the analogue-digital converter 2 prior to 1 sampling interval than the output of the present digital image data of the pixel #22, to delay one sampling interval by the latch circuit 20, wherein the one sampling interval is defined as a sampling interval of the quantization performed by the A/D converter 2.

(3) The digital image data of the pixel #12 shown in FIG. 3. This data is prepared by causing the digital image data which has been outputted from the analogue-digital converter 2 prior to 1H period (one horizontal scanning period) than the output of the present digital image data of the pixel #22, to delay 1H period by the 1H delay circuit 19.

(4) The digital image data of the pixel #11 shown in FIG. 3. This data is obtained by causing the digital image data which has been outputted from the analogue-digital converter 2 prior to 1H period than the output of the present digital data of #22, to delay 1H period by the 1H delay circuit 19 and to delay one sampling interval by the latch circuit 20.

In other words, in the image processing apparatus of the second embodiment, it is possible to construct the apparatus without such memories as required in the first embodiment shown in FIG. 1 by employing a circuit construction of the analogue-digital converter 2 and the 1H delay circuit 19 provided between the analogue-digital converter 2 and the interpolation arithmetic section 22 and the two latch circuits 20, 21 in such a manner that there are outputted at the same time to the interpolation arithmetic section 22 the four digital image data corresponding to a set of four pixels (for instance [#11, #12, #21, #22], [#12, #13, #22, #23], [#13, #14, #23, #24]) which are established corresponding to each of the successive pixels (for instance, pixels #11→#12→#13→#14 . . . #21→#22 →23→#24. . . #31→#32→#33→#34. . . ) sequentially outputted from the analogue-digital converter 2 every sampling interval.

Further, in the image processing apparatus shown in FIG. 2, in order to easily perform the arithmetic processing for the above four data supplied to the interpolation arithmetic section 22 at the same time every sampling interval, a new idea is employed as follows.

Upon arithmetic processing, in the data used in the formulas (1) and (2), the values of L, θ, Vm in the formula (1) are predetermined values to be established, i.e., fixed values. Thus, it will be understood that the value of Yb to be obtained from the formula (1) is a function of Vn irrelative to hn.

This means that digital image data existing on a horizontal scanning line also exist on a horizontal scanning line on the deformed original image obtained by the interpolation arithmetic.

When the deformed original image (refer to 12f in FIG. 6) formed on the image forming section 12 is projected on the screen 17 by the projection lens 15 as a projected image having a constant width along a vertical direction without the trapezoid distortion, a ratio Dx of the largest width to the smallest width on the deformed original image is determined by the established values L, θ, Vm. Thus, a length of a desired line of the digital array existing between the smallest width and the largest width on the image forming section 12 can be obtained by performing a proportional calculation using the ratio Dx when the position of the desired line in the vertical direction is given.

Then, for instance, the values of Dx obtained for every horizontal line corresponding to every declined angle from the plural predetermined declined angles θ(θ1, θ2, θ3, . . . ) are stored in a ROM 25. According to the established declined angle θ, the value of Dx is read out from the ROM 25 and is given to a δX calculating section 26. In the δX calculation section 26, δX is calculated and is given to the interpolation arithmetic section 22.

In accordance with an declined angle, for instance, θ1, the values of Dx for every horizontal line are read out form the ROM 25 and are given to the δX calculating section 26, wherein δX values are calculated with respect to every line of the pixel array. These values are given to the interpolation arithmetic section 22.

Further, the respective values δY used for the interpolation arithmetic are determined as a specified value on a line of the pixel array corresponding to the established value of the declined angle θ. Thus, according to the established declined angle θ, all the values of δY determined every line of the pixel array are stored in the ROM 25 shown in FIG. 2. These values of δY are read out from the ROM 25 and given to the interpolation arithmetic section 22 in accordance with the established value of the declined angle θ.

As mentioned in the foregoing referring to FIG. 6, the deformed original image is deformed as such that a size of the projected image of the deformed original image is reduced. Thus, the number of the overall pixels corresponding to the position "P" (address) calculated by using the formulas (1) and (2) are less than those of the original image. Further, among the four digital image data supplied to the interpolation arithmetic section 22 at the same time every sampling interval, the pixels to be abandoned on the image forming section 12 without being used as the projected picture are preliminarily known, as will be understood from the deformed original image shown in FIG. 6. Thus, the four digital image data corresponding to each of the pixels to be abandoned are not necessary to be calculated in the interpolation arithmetic section 22.

Accordingly, there are prepared particular values (referred to as skip data) in accordance with the values of αX, αY which does not require calculation.

As a result of calculation for every line of the pixel array from the interpolation arithmetic section 22, significant digital image data are only stored in a first-in first-out type line memory (referred to as FIFO line memory) 23. In other words, in the FIFO line memory 23, effective digital image data to form the deformed original image are successively stored in an arrayed state without the skip data.

The digital image data stored in the FIFO line memory 23 corresponding to a line (every scanning line) of the pixel array are in a reduced state in a direction of the width as seen from the length of the width of the image FIG. 12$f$m shown with the solid line in FIG. 6.

The digital image data stored in the FIFO line memory are transferred to and stored in the FIFO image memory 24 in such a time relation as the digital image data situated in the middle position are projected on the middle position of the projected image in the direction of the width on the screen 17.

From the FIFO line memory, the digital image data corresponding to a line of the pixel array are successively read out and stored in the FIFO image memory 24. Thus, the memory pattern formed in the FIFO image memory 24 is similar to the FIG. 12$f$m shown in FIG. 6. However, in the FIFO image memory 24, the effective digital image data to form the deformed original image are only successively stored without the skip data as mentioned in the foregoing. Thus, when the above digital image data are used as they are, the projected image of the deformed original image deviates upward on the screen 17.

Accordingly, upon reading out the digital image data from the FIFO image memory 24, the digital image data are read out in such a time relation as the lowest position of the projected image is situated in a predetermined position. Thereby, the deformed original image formed on the basis of the abovementioned digital image data on the image forming section 12 is projected on the screen 17 by the projection lens 15 as a projected image similar to that of the original image without the trapezoid distortion.

In the image processing apparatus of the second embodiment shown in FIG. 2, the aspect ratio of the projected image is made an appropriate one by using the FIFO line memory 23 and the FIFO image memory 24. Thus, the projected image on the screen 17 becomes similar to the original image. In other words, when the original image has a figure of a circle, it is projected as a projected image having the similar circle.

Incidentally, such a simple type image processing apparatus is capable of projecting an image having a correct image outline but a slightly elongated shape upward may be desired because of reduction of cost.

In that case, it is possible to provide such an image processing apparatus of a third embodiment of the present invention as follows.

The digital image data outputted from the FIFO line memory 3 shown in FIG. 2 are directly given to a surface of the image forming section 12 as a deformed image preliminarily deformed with respect to the original image. The deformed image is projected on the screen 17 by the projection lens 15, wherein a projected image having a correct picture outline but slightly elongated upward is obtained.

According to the image processing apparatus of the present invention, it is possible to obtain an excellent projected image without the trapezoid or keystone distortion even when the apparatus is installed in a state where an optical axis of the projection optical system of the apparatus is declined by a declined angle θ to the normal line of the screen. This allows the apparatus to be installed on the ceiling in a suspended state therefrom, or on the floor without preparing any table.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A compact low cost effective image processing apparatus for use with an image projector for projecting an original image formed on an image forming section of the image projector on a screen by using a projection lens of the projector, the image forming section having a plurality of pixels which are disposed in a two dimensional array, wherein the image processing apparatus generates preliminary deformed original image data deformed with respect to the original image on the image forming section so that a first projected image projected on the screen by the projection lens of which an optical axis if declined to a normal line of the screen to substantially maintain an identical figure against a second projected image projected on the screen by the projection lens wherein the optical axis conforms with the normal line of the screen without a trapezoid distortion, the image processing apparatus comprising:

analogue-digital converting means for converting an image signal capable of forming an image having a predetermined picture outline to digital image signals by a predetermined sampling interval so as to obtain digital image data corresponding to the pixel array of the original image;

means for sequentially reading out four image data of the four pixels as an object of data processing at the same time that sequential digital image data corresponding to a two-dimensional pixel array of the original image, is delayed by a delay line means;

a single ROM for preliminarily preparing first and second data, the first data being prepared with respect to a ratio of a length of the first and second projected images in a width direction corresponding to an identical horizontal scanning line in the original image with respect to respective plural declined angles which are preliminarily prepared for every angle defined as between the optical axis of the projection lens and the normal line of the screen, the second data being prepared with respect to values of an ordinate in the deformed coordinate positions of the deformed original image, wherein the deformed coordinate positions thereof are obtained by using relative formulas defining a relative positional relation between the coordinate positions of the first and second projected images on the screen with respect to identical coordinate positions of the original image;

arithmetic means for calculating for a readout four image data as the object of the data processing by using the first and second data which was preliminarily prepared;

FIFO line memory means for storing selectively effective image data therein for every horizontal scanning line of the image data obtained from the arithmetic means as a result of the arithmetic, the effective data being capable of projecting the first projected image on the screen;

FIFO image memory means for storing the effective data read out from the FIFO line memory at a time when an image data situated in a middle section which is projected on a middle section of the first projected image in the width direction on the screen; and means for reading out the image data stored in the FIFO image memory at a time when a lowest position of the first projected image on the screen is moved to a predetermined position.

* * * * *